United States Patent [19]
Yamamoto et al.

[11] 3,939,856
[45] Feb. 24, 1976

[54] ROTATIONAL SPEED RESPONSIVE TYPE FLUID PRESSURE SIGNAL CONTROL VALVE

[75] Inventors: Yasuhiro Yamamoto, Kariya; Michikatsu Naito, Nagoya, both of Japan

[73] Assignee: Nippondenso Co., Ltd., Kariya, Japan

[22] Filed: Mar. 11, 1974

[21] Appl. No.: 450,236

[30] Foreign Application Priority Data
Mar. 12, 1973  Japan.............................. 48-29268

[52] U.S. Cl................... 137/54; 123/117 R; 137/53
[51] Int. Cl.² ...................... G05D 13/10; F02P 5/04
[58] Field of Search....... 123/117 R, 117 A; 137/53, 137/54; 73/537, 538

[56] References Cited
UNITED STATES PATENTS

| | | | |
|---|---|---|---|
| 2,088,185 | 7/1937 | Borde | 137/54 X |
| 2,653,020 | 9/1953 | Stinson | 137/53 X |
| 2,906,279 | 9/1959 | Binder | 137/54 |
| 2,931,374 | 4/1960 | Randol | 137/54 |
| 3,272,191 | 9/1966 | Walker | 123/117 A |
| 3,409,033 | 11/1968 | Johnston | 137/53 X |
| 3,559,666 | 2/1971 | Walker et al. | 123/117 A X |
| 3,596,567 | 8/1971 | Benjamin | 137/54 X |

FOREIGN PATENTS OR APPLICATIONS

| | | | |
|---|---|---|---|
| 239,653 | 12/1910 | Germany | 137/54 |

*Primary Examiner*—Wendell E. Burns
*Assistant Examiner*—Tony Argenbright
*Attorney, Agent, or Firm*—Cushman, Darby & Cushman

[57] ABSTRACT

A rotational speed responsive type fluid pressure signal control valve comprises a plurality of fly weights rotated by a drive shaft, a sleeve operated by the fly weights, fluid passages provided in the valve and valve bodies actuated by the sleeve so as to open and close the fluid passages, thereby getting a fluid pressure signal from the fluid passages.

1 Claim, 5 Drawing Figures

ROTATIONAL SPEED RESPONSIVE TYPE FLUID PRESSURE SIGNAL CONTROL VALVE

BACKGROUND OF THE INVENTION

This invention relates to a rotational speed responsive type fluid pressure signal control valve which provides a fluid pressure signal in response to the rotational speed. In a conventional fluid pressure control device, the rotational speed is converted into an electric signal, which controls an electromagnetic valve to open and close a fluid passage. Therefore such a device necessitates an electrical signal generator, electrical controller and electromagnetic valve to cause increment of cost and parts.

SUMMARY OF THE INVENTION

With a view to overcome the problem described above, it is a primary object of the present invention to provide a rotational speed responsive type fluid pressure signal control valve of a signal unit, which achieves complete fluid pressure signal switching function without causing increment of manufacturing cost. It is another object of the present invention to provide a rotational speed responsive type fluid pressure signal control valve of a single unit which is installed on a speedometer cable between a transmission of an engine and a speedometer of a vehicle and used to control pressure responsive devices, e.g., an ignition timing control device for reducing harmful exhaust gases emitted from the engine.

The above and other objects, features and advantages of the present invention will be apparent from the following detailed description of preferred embodiments taken in conjunction with the accompanying drawings.

BRIEF DESCRIPTION OF THE PREFERRED EMBODIMENTS

Figure 1:
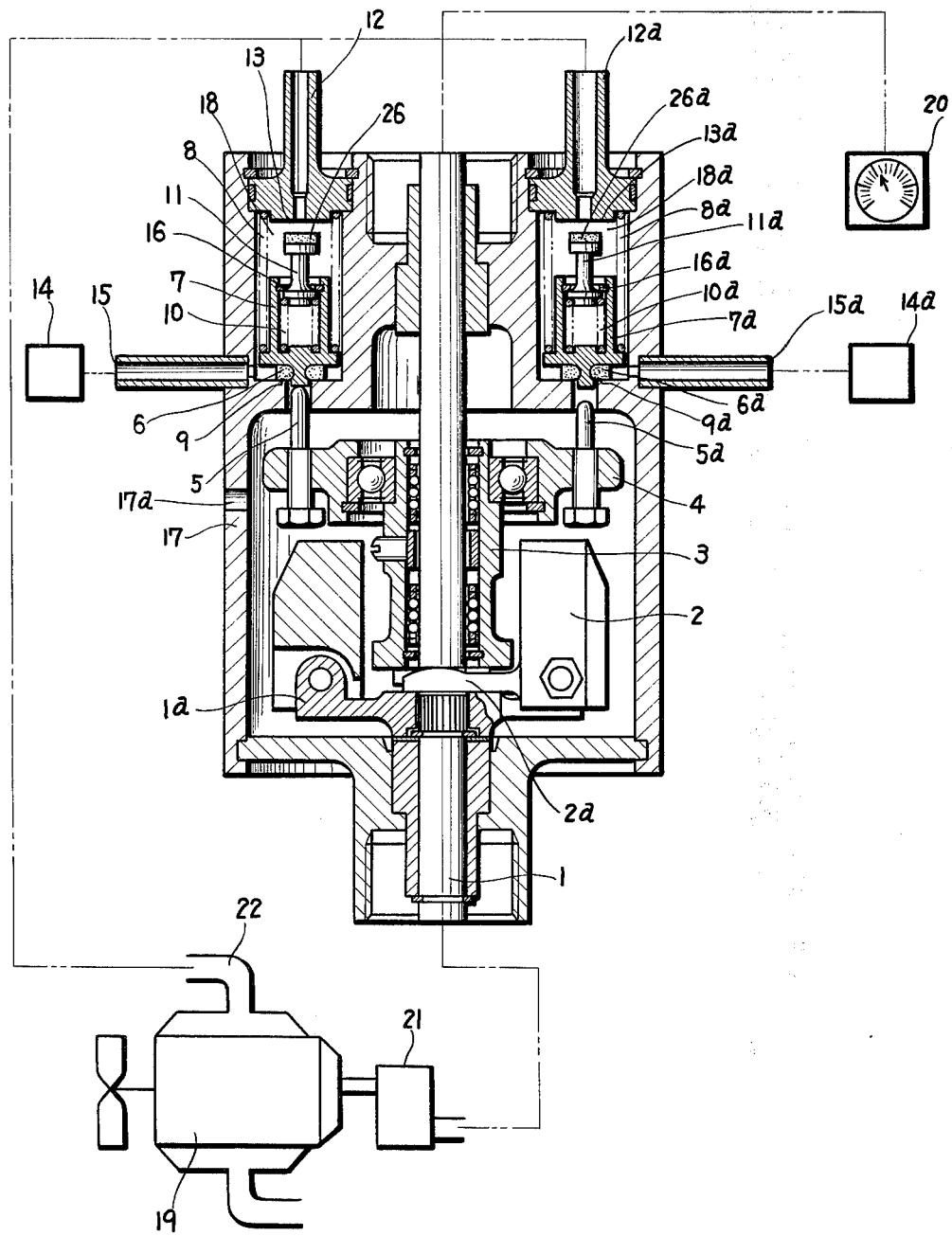
FIG. 1 shows a cross sectional view of the first embodiment of the present invention.

Referring to FIG. 1 showing the first embodiment, numeral 1 designates a drive shaft installed in a housing 17. The upper end of the drive shaft 1 is connected with a speedometer 20 of a vehicle and the lower end thereof is connected with a transmission 21 connected with an engine 19. Numeral 2 designates a couple of fly weights which are pivotally supported by a support member 1a fixed on the drive shaft 1 and have arms 2a extending to the drive shaft 1 respectively. Numeral 3 designates a sleeve slidably fitted on the drive shaft 1 to enable reciprocal movement therealong. The lower end of the sleeve 3 engages with the arms 2a of the fly weights 2. Numerals 5 and 5a designate push rods fixed to a flange member 4 which is rotatably secured to the upper portion of the sleeve 3. Numerals 12 and 12a designate first pipes fixed to the housing 17 and connected with an intake pipe 22 of the engine 19 to lead vacuum pressure produced in the intake pipe 22 into the housing 17. Numerals 15 and 15a designate second pipes fixed to the housing 17 and connected with pressure responsive actuators 14 and 14a which actuate such divices as ignition timing control device and air switching device for reducing harmful exhaust gases of the engine 19. Numerals 7 and 7a designate first valve bodies installed in valve chambers 18 and 18a formed in the housing 17 to connect the first pipes 12 and 12a with the second pipes 15 and 15a. The first valve bodies 7 and 7a have sealing members 6 and 6a at the lower ends thereof respectively and are biassed by coil springs 8 and 8a so as to seat the sealing members 6 and 6a on the first valve seats 9 and 9a provided in the housing 17. Further the lower end surfaces of the first valve bodies 7 and 7a face to the top ends of said push rods 5 and 5a respectively. Numerals 11 and 11a designate second valve bodies installed partially in the first balve bodies 7 and 7a. . The second valve bodies 11 and 11a which are biassed by respective coil springs 10 and 10a of the first valve bodies 7 and 7a and restricted by respective stoppers 16 and 16a have sealing members 26 and 26a, at the respective upper ends, which face to second valve seats 13 and 13a formed at the ends of the first pipes 12 and 12a.

The operation of the pressure signal control valve described above is as follows. On starting the engine 19 to drive the vehicle, the drive shaft 1 begins to rotate and the speedometer 20 begins to operate simultaneously. The vacuum pressure produced in the intake pipe 22 is led through the first pipes 12 and 12a, the valve chambers 18 and 18a and the second pipes 15 and 15a, to the actuators 14 and 14a to apply vacuum pressure signal to the pressure responsive actuators 14 and 14a, thereby operating some devices, such as ignition timing control device and air switching device, since the first valve bodies 7 and 7a are biassed by the springs 8 and 8a to seat the sealing members 6 and 6a on the first valve seats 9 and 9a, and unseat the sealing members 26 and 26a of the second valve bodies 11 and 11a from the second valve seats 13 and 13a, and further the first valve bodies 7 and 7a are inserted in the valve chambers 18 and 18a to remain enough gap to lead vacuum pressure signal therethrough. On this situation, the fly weights 2 rotate also according to the rotation of the drive shaft 1 as a matter of course. Then, when the vehicle speed, that is the rotational speed of the drive shaft 1 reaches a predetermined value, the fly weights 2 strech outwardly and the arms 2a push the sleeve 3 upwards, therefore the rod 5 pushes the first valve body 7 upwards to unseat the sealing member 6 from the first valve seat 9 and to seat the sealing member 26 on the second valve seat 13, so that the vacuum pressure signal is cut off at the first pipe 12 and the atmospheric pressure is applied to the actuator 14 through the second pipe 15 and the opening 17a to change the operation of the device. And then, when the rotational speed reaches another predetermined value, the push rod 5a pushes the first valve body 7a upwards to get similar operation as the above. Needless to say, when the rotational speed goes down, the reverse operation arises.

Figure 2:
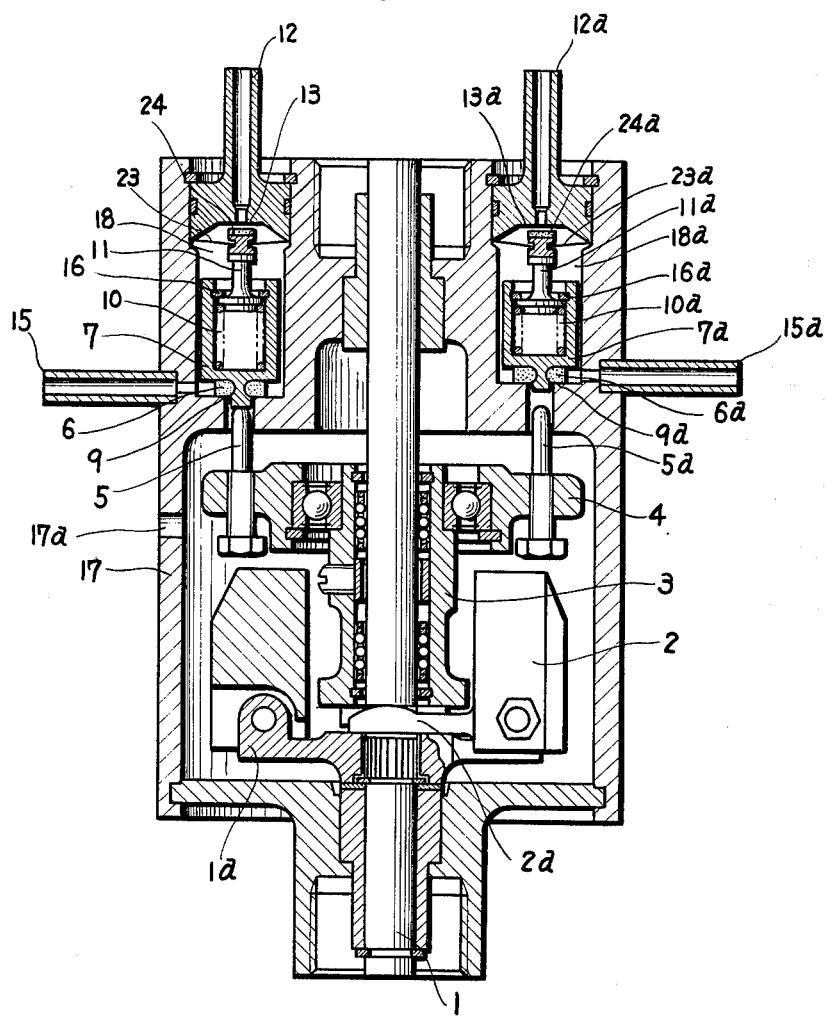
FIG. 2 shows a cross sectional view of the second embodiment of the present invention.
Figure 3:
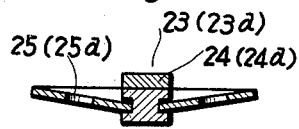
FIG. 3 shows a cross sectional view of a dished spring valve used in the present invention.
Figure 4:
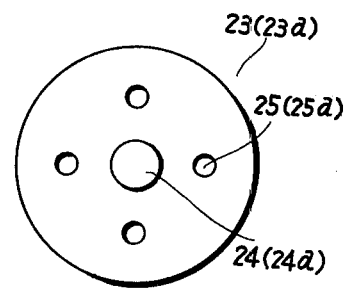
FIG. 4 shows an elevational view of the dished spring valve shown in FIG. 3.
Figure 5:
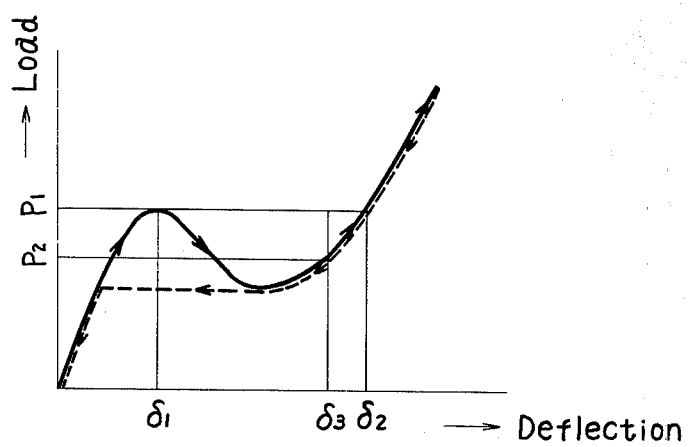
FIG. 5 shows a Load-Deflection characteristic graph of the dished spring valve shown in FIG. 4.

Next, referring to FIGS. 2, 3 and 4 showing the second embodiment which differs from the first embodiment only in respect of the second valve bodies, therefore only about the second valve bodies, explanatory description will be made hereinafter. Numerals 23 and 23a designate dished spring valves installed in the valve chambers 18 and 18a, which are made of phosphor bronze and have sealing members 24 and 24a respectively at the center portions thereof. The outer edges of the valves 23 and 23a are pivotally secured to the housing 1. These dished spring valves 23 and 23a have such a characteristic that when the load which is to be applied to the valve 23 and 23a increases according to the increase of the rotational speed, the deflection of the valves varies as shown by a solid line in FIG. 5, and that when the load decreases, the deflection varies as shown by a broken line in FIG. 5. Numerals 25 and 25a designate leading apertures provided in the dished spring valves 23 and 23a for leading vacuum pressure therethrough.

The operation of the pressure signal control valve of the second embodiment is as follows. When the rotational speed of the drive shaft 1 reaches at the predetermined value, the rod 5 pushes the first valve body 7 upwards to unseat the sealing member 6 from the first valve seat 9 and then the second valve body 11 pushes the center portion of the dished spring valve 23 upwards to seat the sealing member 24 on the second valve seat 13. Therefore the vacuum pressure signal is cut off at the first pipe 12 and the atmospheric pressure is applied to the actuator 14 through the second pipe 15 and the opening 17a to change the operation of the device. When the sealing member 24 of the dished spring valve 23 seats on the second valve seat 13, the dished spring valve 23 deforms to cause quick valve action. Therefore the vacuum pressure signal is cut off sharply at the first pipe 12. This action is easily understood from FIG. 5; that is, when the load reaches $P_1$, the deflection turns suddenly from $\delta_1$ to $\delta_2$, because the load is smaller than $P_1$ in this intermediate part, thereby to get quick valve action. In this condition, the inner edge of the valve must be positioned beneath the outer edge in FIG. 3. Because if the inner edge is positioned above the outer edge, the valve 23 deforms to be a reverse dish, which is not able to return to the initial state. And then, the rotational speed reaches at another predetermined value, the push rod 5a pushes the first valve body 7a upwards to get similar operation as the above. Further, when the rotational speed goes down, the reverse operation arises. Then, since the force to seat the sealing member 24 or 24a on the second valve seat 13 or 13a differs from the force to unseat the sealing member 24 or 24a from the second valve seat 13 or 13a, the hysteresis of valve operation can be obtained to result in stable operation of the valve. It is easily understood from FIG. 5 that when the distance between the sealing member 24 or 24a and the second valve seat 13 or 13a is chosen equal to $\delta_3$, the load to get the deflection $\delta_3$, when increasing, necessiates value $P_1$, while the load to get the same deflection $\delta_3$, when decreasing, corresponds to the value $P_2$. Therefore, the difference of the load between $P_1$ and $P_2$ produces the hysteresis of valve operation.

Furthermore, although the speedometer cable is used in the above two embodiments, other rotating parts of the vehicle are available to operate the pressure signal control valve of the present invention. And although the vacuum pressure is led to the first pipes 12 and 12a, and the actuators 14 and 14a are connected with the second pipes 15 and 15a, the reverse combination is also available for the similar operation as the above. Further, using liquid instead of gas enables also similar operation as the above.

What we claim is;

1. A rotational speed responsive type fluid pressure signal control valve comprising, a drive shaft for transmitting rotating force, fly weights connected with said drive shaft, means combined with said fly weights for reciprocating according to the rotation of said fly weights including a push rod member for operating a valve body means, fluid passage means connected to a vacuum pressure source, actuators and atmospheric area, and valve body means associated with said fluid passage means for operation by said push rod member and said reciprocating means for opening and closing said fluid passage means according to the operation of said reciprocating means to provide a fluid pressure signal including a first valve body member associated with said push rod member to connect said actuators with said atmospheric area and a second valve body member comprising a dished spring valve thereby providing hysteresis of valve operation and for cutting off connection between said vacuum pressure source and said actuators.

* * * * *